US006979276B2

(12) United States Patent
Murray

(10) Patent No.: US 6,979,276 B2
(45) Date of Patent: Dec. 27, 2005

(54) CONTROL SYSTEM AND METHOD FOR A CONTINUOUSLY VARIABLE TRANSMISSION

(75) Inventor: Stephen William Murray, Grimsargh (GB)

(73) Assignee: Torotrak (Development) Limited, (GB)

( * ) Notice: Subject to any disclaimer, the term of this patent is extended or adjusted under 35 U.S.C. 154(b) by 30 days.

(21) Appl. No.: 10/432,137

(22) PCT Filed: Nov. 16, 2001

(86) PCT No.: PCT/GB01/05075

§ 371 (c)(1),
(2), (4) Date: Nov. 6, 2003

(87) PCT Pub. No.: WO02/40898

PCT Pub. Date: May 23, 2002

(65) Prior Publication Data
US 2004/0065520 A1    Apr. 8, 2004

(30) Foreign Application Priority Data
Nov. 16, 2000   (GB)   .................................. 0027997

(51) Int. Cl.$^7$ ............................................ F16H 37/02
(52) U.S. Cl. ..................................................... 475/216
(58) Field of Search ................................. 475/215, 216

(56) References Cited

U.S. PATENT DOCUMENTS

| 5,938,557 | A | | 8/1999 | Greenwood |
| 6,045,477 | A | * | 4/2000 | Schmidt ...................... 475/207 |
| 6,626,793 | B1 | * | 9/2003 | Greenwood ................... 476/10 |

FOREIGN PATENT DOCUMENTS

| EP | 0 899 484 A | 3/1999 |
| GB | 2100372 A | 12/1982 |
| GB | 2108600 A | 5/1983 |
| GB | 2 312 258 A | 10/1997 |
| GB | 2 337 090 A | 11/1999 |

* cited by examiner

Primary Examiner—Dirk Wright
(74) Attorney, Agent, or Firm—Brooks Kushman P.C.

(57) ABSTRACT

A control system for a multi-regime continuously variable ratio transmission system. The system has input and output shafts and a continuously variable ratio transmission unit ("variator") connected to the input shaft. Also included is a mixing epicyclic gear train with a first input gear coupled to the input shaft, a second input gear connected to the variator output and an output gear driving an output shaft. Fluid-pressure actuated clutches engage the outputs and ratio combinations to operate the CVT in a number of regimes. The control system includes means for engaging the clutch of a new regime, retaining both clutches engaged in a synchronous mode and disengaging the clutch of the old regime. The control system also has means for applying fluid pressure to engage the new regime clutch in a single stage at the maximum available clutch engaging fluid pressure.

17 Claims, 4 Drawing Sheets

CONTROL SYSTEM AND METHOD FOR A CONTINUOUSLY VARIABLE TRANSMISSION

TECHNICAL FIELD

The present invention relates to a control system and method for continuously variable transmission systems suitable for use in motor vehicles, for example. In particular, it is concerned with controlling multi-regime transmission, for example a two-regime transmission low and high), an example of which is known from DE-A-2814222.

BACKGROUND ART

A further continuously variable ratio transmission of the toroidal race rolling traction type is described in GB-A-2108600. A two regime continuously variable ratio transmission system, using a toroidal race rolling traction transmission unit and having another connection between the variator and the two epicyclic gear trains, is known from GB-A-2100372.

In such multi-regime transmissions, each regime is selected by a clutch which is engaged by the application of hydraulic fluid pressure as required by the transmission control software. Each regime covers part of the overall ratio spread of the transmission and a small degree of overlap is provided to facilitate switching from one to the next.

On a typical car transmission, low regime provides full reverse, through synchronous ratio to an approximation of second gear forwards and high regime provides an approximation of second gear forwards to full overdrive.

The transmission is so "geared" that changing from one regime to the next requires no change in the ratio of the variator. However the shift process occurs towards one or other of the limits of variator ratio, thereby making best use of its capabilities. Consequently, continuous acceleration through a regime change requires the variator ratio to be moved towards the appropriate limit before the shift but to be reversed thereafter. Since switching the control operation of the variator inevitably introduces a period of diminished capability alternative drive means must be provided during the process.

The provision of a degree of overlap between regimes allows the transmission to reach a finite ratio where simultaneous operation in both regimes is possible (referred to as synchronous ratio). At this point both clutches can be engaged without slip and power is transmitted, albeit at fixed ratio, independently of the variator.

The shift sequence is intended to produce an imperceptible regime change, without interruption to the vehicle's acceleration. It comprises the following operations:

(a) Fill and "lock" the next regime clutch. The clutch is applied by a piston and cylinder that takes a finite time to fill. Sufficient pressure must be applied to the piston to prevent slip but if applied before or after synchronous ratio is reached, will produce "shift shock".

(b) Reverse the control force applied to the variator. This will reverse the power transmitted by the variator. However the two locked regime clutches will ensure power transmission. Fixed ratio operation for a short period will introduce a small but imperceptible engine speed change.

(c) Release the unwanted regime clutch Once the appropriate control force is applied to the variator, it and that regime clutch provide sufficient means for power transmission.

The most difficult part of the process is the engagement of the next clutch. The finite fill time requires that the process be started before the transmission reaches synchronous ratio. The degree of prediction involved requires accurate calculation of the rate of change of transmission ratio plus precise control of the clutch apply pressure.

Currently the engagement of the clutches is achieved by means of a two-stage (or "soft fill") strategy in order to reduce sensitivity to the accuracy of the fill prediction. This involves filling the clutch at a pressure just capable of closing the clutch plates, thus avoiding shift shock if the fill is completed away from synchronous ratio. Subsequent switching of the clutch to high pressure in order to firmly engage the clutch plates can therefore take place virtually instantaneously and thus the decision as to when to engage the clutch can be based on the actual, rather than the predicted, ratio of the transmission.

One disadvantage of this approach is the inevitable increase in the clutch fill time resulting from the lower soft fill pressure. This introduces two issues.

Firstly, the elapsed time required to complete a regime change is unduly long. The need for best economy requires the engine to be operated at the lowest practical speed. Light throttle cruise is therefore provided with the engine at or close to idle. Acceleration demands then require an accompanying engine speed increase, which is likely to provoke a regime change into low. Protracted shift times are then perceived by the driver as response delays.

Secondly, it is difficult to predict accurately the correct time to engage a clutch. Lengthening the fill period requires an earlier shift initiation. Changing traffic conditions are then more likely to invalidate the prediction.

SUMMARY OF INVENTION

It is an object of the present invention to reduce the overall time taken to complete a regime change without sacrificing shift quality or control robustness.

In accordance with a first aspect of the present invention there is provided a control system for a multi-regime continuously variable ratio transmission system having input and output shafts and comprising a continuously variable ratio transmission unit ("variator") connected to the input shaft, a mixing epicyclic gear train having a first input gear coupled to the input shaft, a second input gear connected to the variator output and an output gear driving an output shaft and a plurality of fluid-pressure actuated clutches to engage the outputs and ratio combinations to operate the variator in a plurality of regimes, the control system comprising means for engaging the clutch of a new regime, retaining both clutches engaged in a synchronous mode and disengaging the clutch of the old regime, characterised in that the control system comprises means for applying fluid pressure to engage the new regime clutch in a single stage.

Preferably, the control system comprises first control means controlling a clutch apply pressure supplied to the clutches so as to initiate engagement and disengagement thereof during regime change and second control means controlling the setting of the variator, wherein the first and second control means are operable independently of each other in such a way that the operation of the variator is unaffected by the variations in the clutch apply pressures.

In one embodiment, the control system comprises:
   first and second hydraulic supply pipes;
   first and second hydraulic pumps associated with said first and second supply pipes respectively for pumping hydraulic fluid therethrough and for raising its pressure;

a first hydraulic pressure control valve for controlling the pressure of hydraulic fluid to be supplied to the roller control pistons of the variator;

a second hydraulic pressure control valve for controlling the pressure of hydraulic pressure to be supplied to a clutching arrangement of the transmission;

wherein the valves are connected in flow series and by a first fluid directing valve means for directing flow from each pump to a first point upstream of the first valve or to a point downstream of the first valve but upstream of the second valve.

In another embodiment, the system further comprises a source of pressurized fluid and means for selectively connecting the source of pressurized fluid to the clutches. The source of pressurized fluid preferably comprises an accumulator which is selectively connectable to the clutches via valve means. Each clutch may be selectively connectable to the accumulator by means of an associated valve.

In accordance with a second aspect of the present invention there is provided a control method for a multi-regime continuously variable ratio transmission system having input and output shafts and comprising a continuously variable ratio transmission unit ("variator") connected to the input shaft, a mixing epicyclic gear train having a first input gear coupled to the input shaft, a second input gear connected to the variator output and an output gear driving an output shaft and a plurality of fluid-pressure actuated clutches to engage the outputs and ratio combinations to operate the variator in a plurality of regimes, the control method comprising engaging the clutch of a new regime, retaining both clutches engaged in a synchronous mode and disengaging the clutch of the old regime, characterised in that the fluid pressure to engage the new regime clutch is applied in a single stage.

Preferably, the control method comprises controlling a clutch apply pressure supplied to the clutches so as to initiate engagement and disengagement thereof during the regime change and controlling the setting of the variator, wherein the clutch apply pressure is controlled independently of the setting of the variator in such a way that the operation of the variator is unaffected by the variations in the clutch apply pressure.

In one embodiment, a control method for use with a control circuit comprising first and second hydraulic supply pipes, first and second hydraulic pumps associated with said first and second supply pipes respectively for pumping hydraulic fluid therethrough and for raising its pressure, a first hydraulic pressure control valve for controlling the pressure of hydraulic fluid to be supplied to the roller control pistons of the variator and a second hydraulic pressure control valve for controlling the pressure of the hydraulic fluid to be supplied to a clutching arrangement of the transmission comprises:

connecting the valves in flow series and directing fluid flow from each pump to a first point upstream of the first valve or to a second point downstream of the first valve but upstream of the second valve.

In another embodiment, the fluid pressure to engage the clutches is from a source of pressurized fluid. The source of pressurized fluid preferably comprises an accumulator whose pressure is selectively applied to the clutches by valve means.

By applying fluid pressure to engage the new regime clutch in a single stage at high pressure, the clutch is filled very rapidly, which allows the transmission to be closer to the desired ratio for regime change. The degree of prediction required for the transmission is thus reduced.

BRIEF DESCRIPTION OF THE DRAWINGS

By way of example only, specific embodiments of the present invention will now be described, with reference to the accompanying drawings, in which.

BEST MODES FOR CARRYING OUT THE INVENTION

Figure 1:
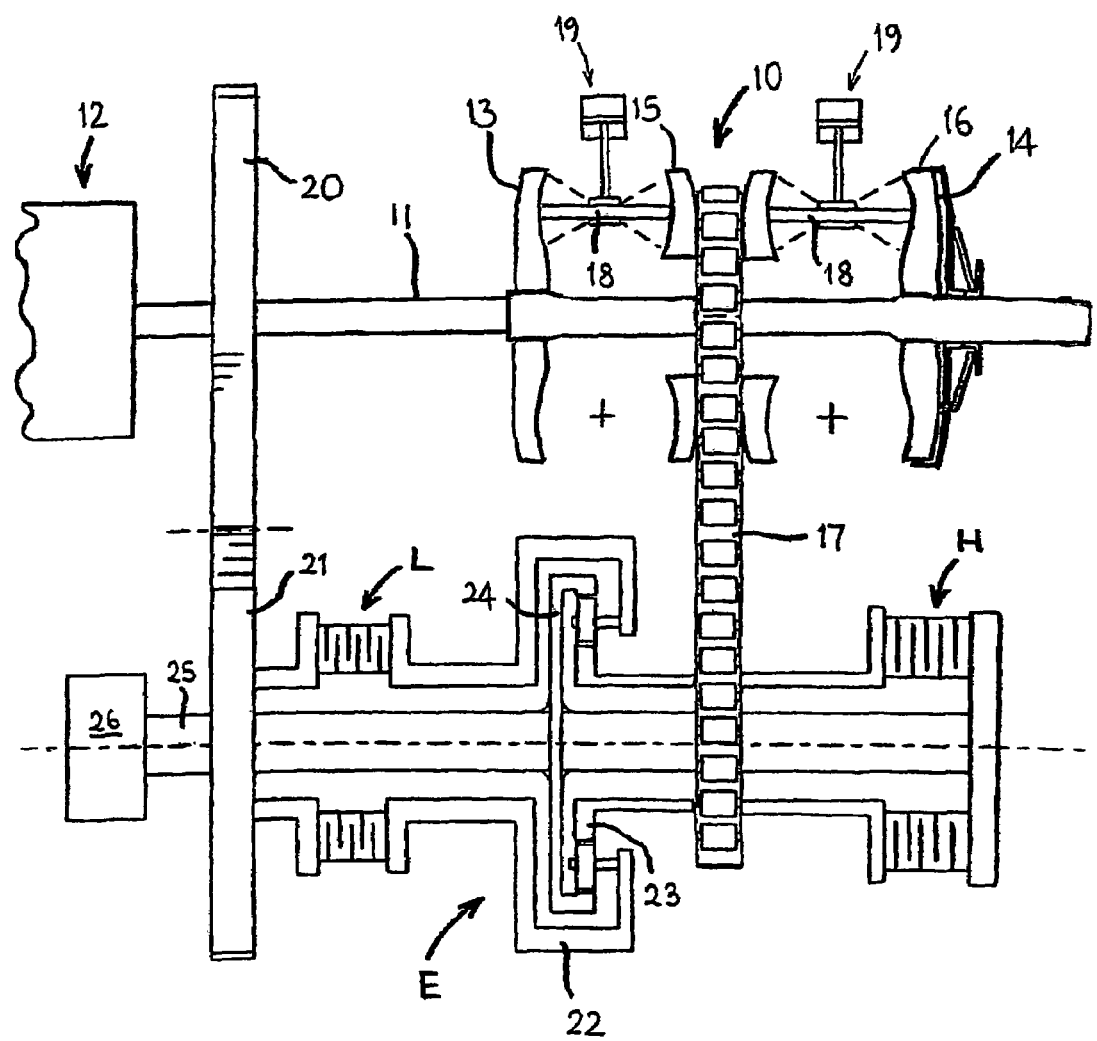
FIG. 1 is a schematic illustration of a vehicle transmission controlled in accordance with the present invention.

FIG. 1 illustrates one embodiment of continuously variable transmission controlled in accordance with the present invention. The transmission shown is for a front wheel drive vehicle but the invention is equally applicable to rear wheel drive and all wheel drive transmissions.

The transmission as illustrated is generally conventional. A toroidal race-rolling traction type continuously variable ratio transmission unit 10 (hereinafter referred to as variator 10) has an input shaft 11 from an engine 12. The input shaft 11 drives a toroidally-recessed disc 13, 14 at each end of the variator 1. A pair of similar discs 15; 16 facing respective ones of the driven discs 13, 14, is connected to a variator output sprocket (not visible in the drawings) around which a chain 17 is entrained. As described more fully in GB-A-2108600 and GB-A-2100372, sets of rollers 18 are mounted between opposing faces of these discs to transmit drive from the input shaft 11 to the chain 17 with a gear ratio which is variable by the tilt of the rollers.

The input shaft 11 also drives a gear 20 mounted thereon which meshes with an identical gear 21 which is selectively connected to the planet carrier 22 of an epicyclic gearset E via a low regime clutch L. The chain 17 transmits the output of the variator 10 to the sun gear 23 of the epicyclic gear set E and to the input of a high regime clutch H. The annulus 24 of the epicyclic gearset E is permanently connected to a transmission output shaft 25 which is connected to the vehicle differentials and roadwheels 26. The output shaft 25 may also be connected directly to the variator output by engaging the high regime clutch H.

In low regime operation, the low regime clutch is engaged and the high regime clutch H is disengaged. Power from the engine 12 drives the variator 10 and the gearset 20, 21 so that the planet carrier 22, the chain 17 and the sun gear 23 of the epicyclic gearset E are all driven. Thus, the planet carrier 22 and the sun gear 23 receive drive from the engine simultaneously and the annulus 24, which sums the two drives, acts as the output component of the epicyclic gearset E In high regime operation, drive is produced by the hydraulic forces on the variator 10 acting in reverse (as compared with low regime operation). The high regime clutch H is engaged and the low regime clutch L is disengaged. Thus the epicyclic gearset E is effectively inactive and the output of the variator 10 is connected directly to the output shaft 25 via the engaged high regime clutch H.

During acceleration in low regime, the rotational speed of the sun gear 23, which is an output from the variator 10, is reduced by operating the variator at a progressively lower speed ratio and thus the forward drive from the planet carrier 22 dominates. When the variator ratio reaches its lower limit, the sun gear 23, the planet carrier 22 and the annulus 24 rotate in unison, resulting in the two sides of the high regime clutch also rotating at equal speeds.

The change to high regime operation (or vice versa) occurs in this condition if acceleration continues. The present invention relates to the method of achieving the change of regime.

The change from one regime to another will be described with reference to FIG. 2. The change described is from low regime to high regime but the principle is the same for changing from high regime to low regime.

At step 100 (hereafter "step" will be abbreviated to "S") the transmission is operating in low regime with the variator at its lower limit As explained previously, this results in rotation of the sun gear 23, the planet carrier 22 and the annulus 24 together and results in the two sides of the high regime clutch H rotating at equal speeds (known as "synchronous ratio" operation).

At S102 the high regime clutch H is engaged. In contrast to the prior art, the hydraulic pressure to engage the clutch is applied in a single stage at the maximum available pressure. This results in very rapid, almost instantaneous, engagement of the high regime clutch (H) and for a very brief period of time results in the transmission being held in the synchronous ratio since both clutches L, H are briefly engaged at the same time.

The clutch engagement pressure is applied as rapidly as possible but preferably it should take no longer than 40 ms, to apply the full clutch engagement pressure.

At S104 the control force applied to the variator is reversed. This reverses the power transmitted by the variator but the two locked regime clutches ensure continuous power transmission. Finally, at S106 the low regime clutch L is disengaged, leaving the transmission operating in high regime.

By applying the fluid pressure to engage the new regime clutch in a single stage at high pressure, the clutch is filled very rapidly, which allows the transmission to be closer to the desired ratio for regime change. The degree of prediction required for the transmission is thus reduced and, in some circumstances, may be eliminated.

Figure 3:
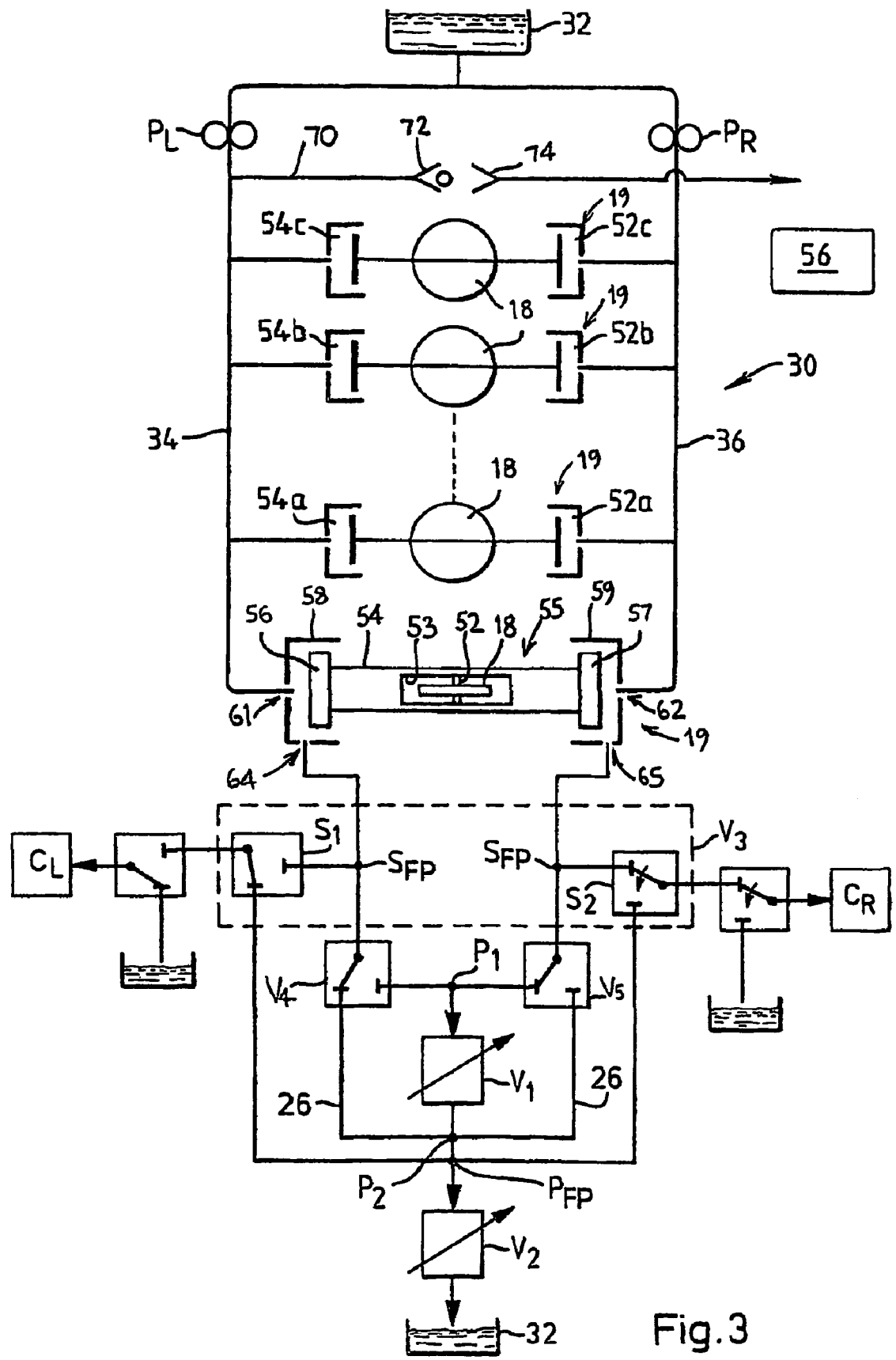
FIG. 3 is a schematic illustration of a first embodiment of hydraulic control circuit according to the present invention.

A schematic hydraulic control circuit for implementing the present invention is illustrated in FIG. 3. The circuit comprises a control circuit 30 having first and second fluid pumps $P_L$, $P_R$, each of which supplies fluid from a reservoir or sump 32 and directs it to first and second supply pipes 34, 36 respectively. At the downstream end of each of the supply pipes 34, 36, there is positioned a valving arrangement V3, which may comprise a single or two individual solenoid valves S1 or S2 respectively, and further switching valves V4, V5 connected in lines 34, 36 respectively below valving arrangement V3. In either arrangement, said valves V3, V4, V5 are arranged such that the supply from each of pumps $P_L$, $P_R$ may be selectively directed to either a first point P1 upstream of a control valve V1 or to a second point P2 downstream of said valve but upstream of a further valve V2. Valves V1 and V2 (in some embodiments) are pressure raising valves, i.e. operation thereof restricts the flow therethrough and raises the pressure in the supply thereto whilst valves S1, S2, V4 V5 are simply solenoid valves having no effect on the line pressure. As can be seen, control valves V1 and V2 are connected in flow series.

One double-acting hydraulic piston 19 is illustrated schematically in more detail in FIG. 3. Only one piston 19 is illustrated but each roller 18 is controlled by an identical respective piston.

The axle 52 of each roller 18 is mounted in the cavity 53 of a hollow shaft 54 of a double-acting piston 55. This piston is formed with opposed piston heads 56, 57 which are both free to slide under hydraulic load within coaxial cylindrical caps 58, 59 and to rotate about the longitudinal axis of the shaft 54. Together, piston 55 and end cap 58, 59 act to define the hydraulic piston 19 associated with each roller. It will be appreciated that the description of the hydraulic piston 19 is purely schematic.

The hydraulic fluid inlets 61, 62 and outlets 64, 65 for the pistons 19 are formed in the end and side walls of the associated cylinder caps 58, 59 and the first and second supply pipes 34, 36 ensure that the pistons 19 behave in exactly the same way so that all the variator rollers are continuously maintained at the same pressure differential as one another.

It will also be observed that a cross-connection 70 exists between the first and second supply pipes 34, 36 and communicates by way of a higher-pressure-wins arrangement of non-return valves 72, 74, the outlet of which is fed to a pressure chamber 27 (FIG. 1) for applying an axial load to the input disc 14 at one end of the variator, in the conventional manner.

The solenoid valves S1, S2, V4, V5 are arranged to connect either or both of supply pipe 34, 36 to valve $V_1$ or $V_2$ and, in the connection arrangement shown in this figure $P_1 > P_2$ by the $\Delta P$ across $V_1$. The $\Delta P$ across $V_2$ sets the absolute pressures within the control circuit without affecting the $\Delta P$ between the pumps and has no effect on $V_1$ (unless flows from the pumps change, e.g. as a result of pressure relief valves). Consequently, in the connection arrangement shown in FIG. 3, $V_1$ may be employed as the variator control valve whilst $V_2$ may be employed as the clutch control valve.

For example, in order to engage clutch $C_L$, valve S1 is switched to the position shown in FIG. 3 in order to connect P2 to clutch $C_L$. The connection is made via a dump valve D1 which can be switched from the position shown in FIG. 3 where clutch $C_L$ is connected to a sump or drain to an alternative position in which the clutch $C_L$ is connected to valve S1. Thus, the pressure is applied in a single stage in contrast to the two-stage process of the prior art. This arrangement allows application of clutch engagement pressure in a time period of 40 ms or less.

The clutch $C_R$ may be applied identically by suitable actuation of valves S2, V5 and a clutch dump valve D2 identical to D1 for clutch $C_L$.

In the arrangement of FIG. 3, it is possible to provide fail-safe operation by setting the solenoid valves S1, S2 to the same point such that zero differential pressure is created across the pumps and no variator reaction force is thus created. It is worth noting at this stage that variation of the back pressures created by each of valves V1, V2 is employed in the control of roller position and/or control clutch engagement. Clearly, in this arrangement any variation in the back pressure created by the valve $V_2$ will have absolutely no effect on the back pressure created by valve $V_1$ as differential pressure is used to control the variator. Consequently, clutch engagement may be achieved in a single stage without affecting the position of the variator rollers.

Figure 4:
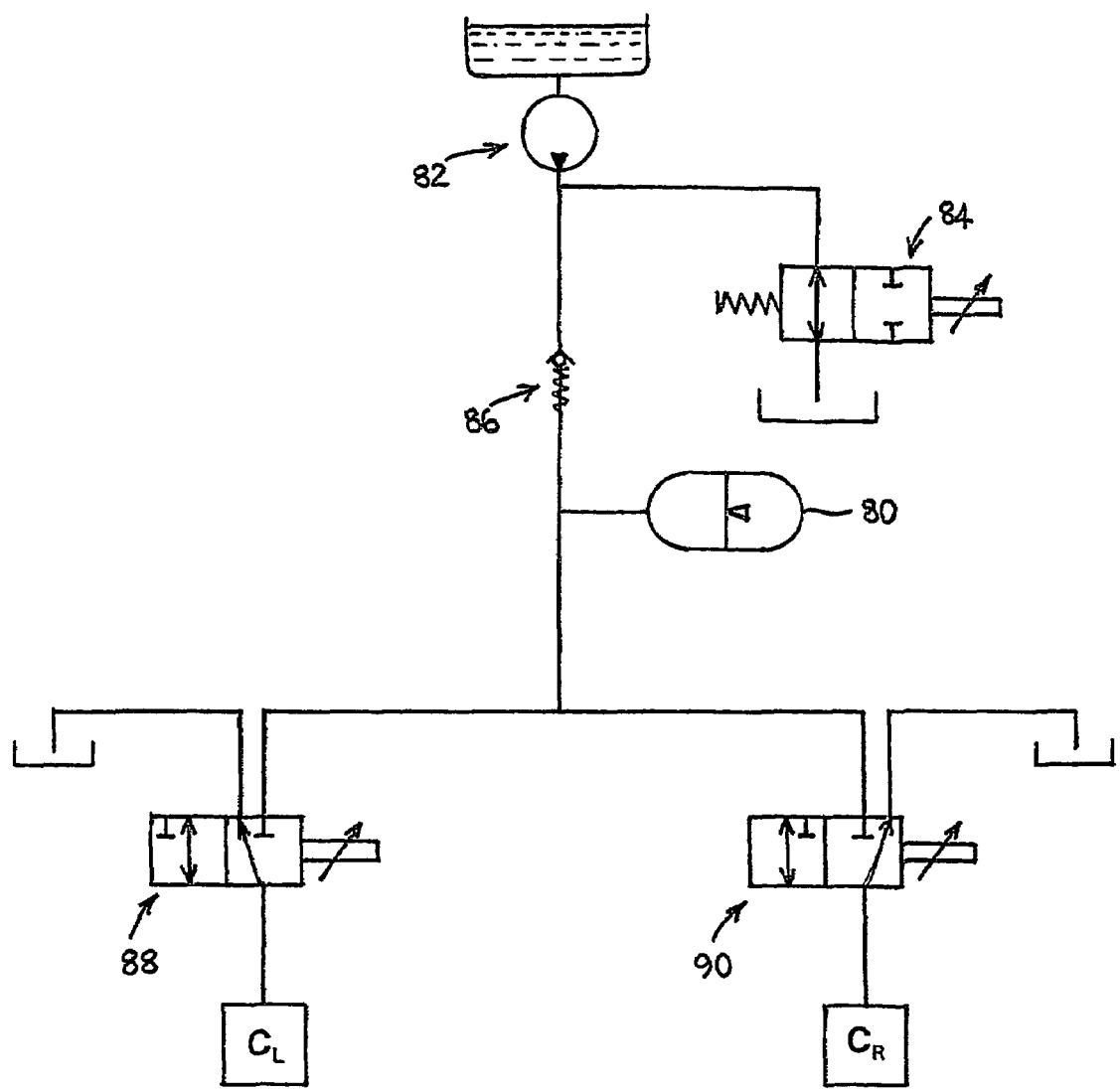
FIG. 4 is a schematic illustration of a further embodiment of hydraulic clutch control circuit in accordance with the present invention.

A simplified embodiment of the present invention is illustrated in FIG. 4. The arrangement of FIG. 4 differs from the previous embodiments in that it operates independently of the variator control circuit FIG. 4 illustrates the two hydraulically actuated clutches $C_L$ and $C_R$ as for the previous embodiment. The clutches are engaged by the application of fluid pressure from a conventional accumulator 80 having a resiliently variable volume which is held at a high pressure by means of a pump 82 and a relief valve 84 which opens to vent the pump output when the required accumulator pressure has been obtained.

The pump output is fed via a non-return valve 86 to the accumulator 80 which is further connected to two control valves 88, 90 which each control the application of accumulator pressure to a respective one of the clutches $C_L$ and $C_R$. The valves 88, 90 are operable electrically to connect the clutches $C_L$ and $C_R$ respectively to either the accumulator pressure or to drain. Thus, when it is desired to engage one of the clutches $C_L$ and $C_R$, the appropriate valve 88, 90 is actuated to connect the clutch to the accumulator pressure. The clutch apply pressure is thus applied in a single stage and at a single pressure equal to the pressure in the accumulator. In order to disengage either of the clutches $C_L$ and $C_R$, the appropriate valve 88, 90 is actuated to connect the clutch to drain and to isolate the clutch from the accumulator.

Figure 2:
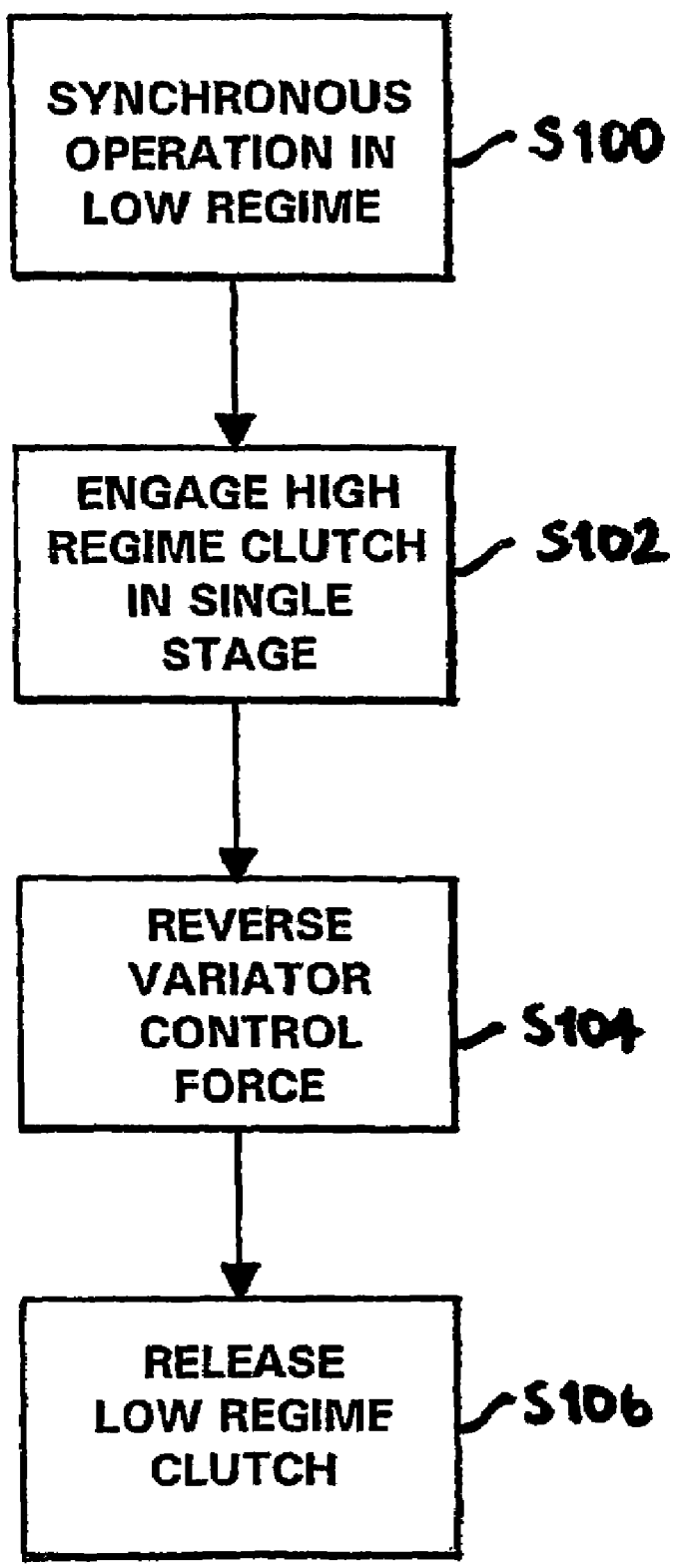
FIG. 2 is a flow chart illustrating the control of the transmission of FIG. 1.

Thus, the clutch engaging sequence of FIG. 2 may be achieved simply using a "hard-fill", single stage clutch engaging step. As for the first embodiment, the arrangement allows the full clutch engagement pressure to be applied in 40 ms or less.

The invention is not restricted to the details of the foregoing embodiments.

What is claimed is:

1. A control system for a multi-regime continuously variable ratio transmission system having input and output shafts and comprising a continuously variable ratio transmission variator connected to the input shaft, a mixing epicyclic gear train having a first input gear coupled to the input shaft, a second input gear connected to the variator output and an output gear driving an output shaft and a plurality of fluid-pressure actuated clutches to engage the outputs and ratio combinations to operate the continuosly variable ratio transmission variator in a plurality of regimes, the control system comprising means for engaging the clutch of a new regime, retaining both clutches engaged in a synchronous mode and disengaging the clutch of the old regime, the control system comprising means for applying fluid pressure to engage the new regime clutch in a single stage at the maximum available clutch engaging fluid pressure.

2. A control system as claimed in claim 1, comprising first control means controlling a clutch apply pressure supplied to the clutches so as to initiate engagement and disengagement thereof during regime change and second control means controlling the setting of the variator, wherein the first and second control means are operable independently of each other in such a way that the control of the variator is unaffected by the variations in the clutch apply pressures.

3. A control system as claimed in claim 2, comprising:
   first and second hydraulic supply pipes;
   first and second hydraulic pumps associated with said first and second supply pipes respectively for pumping hydraulic fluid therethrough and for raising its pressure;
   a first hydraulic pressure control valve for controlling the pressure of hydraulic fluid to be supplied to the roller control pistons of the variator;
   a second hydraulic pressure control valve for controlling the pressure of hydraulic pressure to be supplied to a clutching arrangement of the transmission;
   wherein the valves are connected in flow series and by a first fluid directing valve means for directing flow from each pump to a first point upstream of the first valve or to a point downstream of the first valve but upstream of the second valve.

4. A control system as claimed in claim 1, further comprising a source of pressurized fluid and means for selectively connecting the source of pressurized fluid to the clutches.

5. A control system as claimed in claim 4, comprising an accumulator and valve means for selectively connecting the accumulator to the clutches.

6. A control system as claimed in claim 5, wherein each clutch is selectively connectable to the accumulator by means of an associated valve.

7. A control method for a multi-regime continuously variable ratio transmission system having input and output shafts and comprising a continuously variable ratio transmission variator connected to the input shaft, a mixing epicyclic gear train having a first input gear coupled to the input shaft, a second input gear connected to the variator output and an output gear driving an output shaft and a plurality of fluid-pressure actuated clutches to engage the outputs and ratio combinations to operate the continuously variable ratio transmission variator in a plurality of regimes, the control method comprising engaging the clutch of a new regime, retaining both clutches engaged in a synchronous mode and disengaging the clutch of the old regime, the fluid pressure to engage the new regime clutch being applied in a single stage at the maximum available clutch engaging fluid pressure.

8. A control method as claimed in claim 7, comprising controlling a clutch apply pressure supplied to the clutches so as to initiate engagement and disengagement thereof during the regime change and controlling the setting of the variator, wherein the clutch apply pressure is controlled independently of the setting of the variator in such a way that the control of the variator is unaffected by the variations in the clutch apply pressure.

9. A control method as claimed in claim 8 for use with a control circuit comprising first and second hydraulic supply pipes, first and second hydraulic pumps associated with said first and second supply pipes respectively for pumping hydraulic fluid therethrough and for raising its pressure, a first hydraulic pressure control valve for controlling the pressure of hydraulic fluid to be supplied to the roller control pistons of the variator and a second hydraulic pressure control valve for controlling the pressure of the hydraulic fluid to be supplied to a clutching arrangement of the transmission;
   wherein the valves are connected in flow series and fluid flow from each pump is directed to a first point upstream of the first valve or to a second point downstream of the first valve but upstream of the second valve.

10. A control method as claimed in claim 7, wherein the fluid pressure is selectively connected to the clutches from a source of pressurized fluid.

11. A control method as claimed in claim 10, wherein the fluid pressure is selectively applied to the clutches from an accumulator by valve means.

12. A control system as claimed in claim 2, further comprising a source of pressurized fluid and means for selectively connecting the source of pressurized fluid to the clutches.

13. A control system as claimed in claim 12, comprising an accumulator and valve means for selectively connecting the accumulator to the clutches.

14. A control system as claimed in claim 13, wherein each clutch is selectively connectable to the accumulator by means of an associated valve.

15. A control method as claimed in claim 8, wherein the fluid pressure is selectively connected to the clutches from a source of pressurized fluid.

16. A control method as claimed in claim 15, wherein the fluid pressure is selectively applied to the clutches from an accumulator by valve means.

17. A control system for a multi-regime continuously variable ratio transmission system having input and output shafts and comprising a continuously variable ratio transmission unit variator connected to the input shaft, a mixing epicyclic gear train having a first input gear coupled to the input shaft, a second input gear connected to the variator output and an output gear driving an output shaft and a plurality of fluid-pressure actuated clutches to engage the outputs and ratio combinations to operate the continuously variable ratio transmission variator in a plurality of regimes, the control system comprising means for engaging the clutch of a new regime, retaining both clutches engaged in a synchronous mode and disengaging the clutch of the old regime, the control system comprising means for applying fluid pressure to engage the new regime clutch in a single stage at the maximum available clutch engaging fluid pressure, The control system comprising a source of pressurized fluid for applying fluid pressure to engage the new regime clutch in a single stage at the maximum available clutch engaging fluid pressure.

* * * * *

UNITED STATES PATENT AND TRADEMARK OFFICE
CERTIFICATE OF CORRECTION

PATENT NO.    : 6,979,276 B2  
DATED         : December 27, 2005  
INVENTOR(S)   : Stephen William Murray It is certified that error appears in the above-identified patent and that said Letters Patent is hereby corrected as shown below:

Column 10,  
Line 11, delete "The" and insert -- the --.

Signed and Sealed this

Fourth Day of April, 2006

JON W. DUDAS  
*Director of the United States Patent and Trademark Office*